(12) United States Patent
Bache et al.

(10) Patent No.: US 11,749,312 B2
(45) Date of Patent: Sep. 5, 2023

(54) TIMELINE CREATION OF ELECTRONIC DOCUMENT CREATION STATES

(71) Applicant: Adobe Inc., San Jose, CA (US)

(72) Inventors: Jesper Storm Bache, Menlo Park, CA (US); Bradee Rae Evans, Alameda, CA (US)

(73) Assignee: Adobe Inc., San Jose, CA (US)

( * ) Notice: Subject to any disclaimer, the term of this patent is extended or adjusted under 35 U.S.C. 154(b) by 129 days.

(21) Appl. No.: 15/469,178

(22) Filed: Mar. 24, 2017

(65) Prior Publication Data

US 2018/0276189 A1 Sep. 27, 2018

(51) Int. Cl.
*G06F 17/00* (2019.01)
*G11B 27/34* (2006.01)
*G11B 27/031* (2006.01)

(52) U.S. Cl.
CPC ............ *G11B 27/34* (2013.01); *G11B 27/031* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,583,140 B1 * | 2/2017 | Rady | | H04N 21/44004 |
| 2003/0007567 A1 * | 1/2003 | Newman | | H04N 19/63 |
| | | | | 375/240.27 |
| 2003/0085997 A1 * | 5/2003 | Takagi | | G11B 27/031 |
| 2004/0133850 A1 * | 7/2004 | Nitzberg | | G11B 27/031 |
| | | | | 715/255 |
| 2004/0267835 A1 * | 12/2004 | Zwilling | | G06F 11/2097 |
| 2006/0161585 A1 * | 7/2006 | Clarke | | G06F 40/197 |
| 2012/0210217 A1 * | 8/2012 | Abbas | | G11B 27/00 |
| | | | | 715/716 |
| 2012/0210222 A1 * | 8/2012 | Matsuda | | G06F 3/04847 |
| | | | | 715/716 |
| 2012/0210232 A1 * | 8/2012 | Wang | | H04N 19/117 |
| | | | | 715/723 |

(Continued)

OTHER PUBLICATIONS

Teacher, "How to Select Multiple Files and Folders in Windows Jul. 8, 2010 Tutorial", https://www.youtube.com/watch?v=97Wiwf_hkjM &t=29s, Jul. 21, 2014.*

(Continued)

*Primary Examiner* — Mohammed H Zuberi
(74) *Attorney, Agent, or Firm* — Fig 1. Patents (57) ABSTRACT

Timeline creation of electronic document creation states is described. In one or more implementations, document creation states are created responsive to performing editing operations on a document. Document creation state snapshots are then generated for respective document creation states responsive to the document creation states meeting at least one criterion. The at least one criterion may be based on an amount of change in the document, completion of an editing operation, specific alterations to the document, a user request to create a document creation state snapshot, and so on. The resulting document creation state snapshots along with visual representations of metadata associated with the respective document creation states are compiled into a single timeline in a chronological order of when the respective document creation states occurred.

20 Claims, 7 Drawing Sheets

(56) References Cited

U.S. PATENT DOCUMENTS

| | | | | |
|---|---|---|---|---|
| 2013/0120439 A1* | 5/2013 | Harris | .................... | G11B 27/34 |
| | | | | 345/619 |
| 2013/0125000 A1* | 5/2013 | Fleischhauer | .......... | G11B 27/10 |
| | | | | 715/723 |
| 2014/0317506 A1* | 10/2014 | Rustberggaard | ...... | G06F 3/0484 |
| | | | | 715/716 |
| 2015/0010286 A1* | 1/2015 | Newman | ................ | H04N 19/63 |
| | | | | 386/230 |
| 2022/0028427 A1* | 1/2022 | Matsuda | ............. | G06F 3/04847 |

OTHER PUBLICATIONS

PhotosInColor "Photoshop Tutorial—Photoshop Layers and Layer Masks for beginners", Aug. 10, 2016 https://www.youtube.com/watch?v=jA-Aw6WWdSE.*

* cited by examiner

TIMELINE CREATION OF ELECTRONIC DOCUMENT CREATION STATES

BACKGROUND

In order to create an electronic document, hereinafter also referred to simply as a "document" in the following discussion, a computing device performs any number of composition or editing operations to achieve a final result. For example, in order to create a document, such as an image, photo, digital painting, flowchart, presentation, and so on, a computing device may compose a first object, add other objects to the image, move the objects, change sizes of the objects, add a background, change colors, change text, and so on in a chronological order. In many cases, a user that initiates the editing operations may wish to chronicle various states of the document during the creation of the document, i.e. an order of operations that lead to a final result, such that a process used to create the document can be duplicated, taught, or otherwise documented. If the document is an image containing a car, trees, and clouds, for example, a user may want to depict that the car was created first, the trees were created second, and the clouds were added third such that another user can comprehend how the image was created and optionally recreate the image using a similar order of operations.

One conventional approach of chronicling document creation involves a screen capture technique. Screen capture is used to create an image by a computing device responsive to receiving a user request to capture an entire display (print screen) or a portion of a display (snipping tool) of a user interface at a corresponding point in time. However, screen capture techniques may lack specificity and accuracy in portraying the document creation process. In the case of an entire display, a screen capture often may include aspects of a user interface that a user may not wish to chronicle, e.g. mouse icon, tool bars, other windows, and so on. In the case of partial displays, a user is required to manually select which portions of a display to capture, which is tedious and often requires a zoom and/or pan operation to capture an entire document. Furthermore, conventional screen capture techniques only produce an image at a request of a user and are thus not easily automatable.

Another conventional technique used to chronicle document creation involves screen capture videos. Screen capture videos are created by generating and combining a series of screen captures by a computing device at specified time intervals, e.g. 24 frames per second. Because screen capture videos contain screen captures, the videos often fail to be useful for the reasons described above. Furthermore, because there is no determination as to whether or not a frame should be generated, screen capture videos may include editing operations that a user may not wish to chronicle. Conversely, a screen capture video may quickly speed over an operation that a user may find to be relevant but languish over an operation that the user does not. Thus, conventional techniques fail to efficiently and accurately chronicle meaningful document creation states such that a user can convey a process used to create the document.

SUMMARY

Timeline creation of document creation states by a computing device is described that is based, at least in part, on combining a plurality of document state snapshots generated by the computing device that represent chronological states of a document into a timeline. The chronological states of the document are determined by the computing device based on one or more criteria to efficiently and accurately describe creation of the document. Examples of criteria include an amount of modification to the document, completion of an editing operation to the document, type of editing operation to the document, an expiration of a timer, a received request from a user, and so forth. In this way, a user who interacts with the timeline can quickly view states that are relevant to the creation of the document.

In an implementation, a digital medium environment includes at least one computing device that is configured to receive editing operations to a document. A document may be configured in a variety of ways, such as an image, a photo, a portable document format, and so on as previously described. Editing operations may include any composition or editing operations such as character creation, object creation, object modification, color changes, layer creations, and so on.

Responsive to determining that a criterion has been met, the computing device generates a document state snapshot that represents a state of the document when the snapshot is created, such as a lower resolution image of the document, along with metadata associated with the state of the document or editing operations that lead to the state of the document. A variety of criteria may be used. For example, the criteria may involve a user request at a point-in-time during document creation. In another example, the criteria may be configured as a set of rules determined by the computing device, such as an amount of change of the document, completion of an editing operation, and so on. The document state snapshot is configurable in a variety of ways, such as a thumbnail image of a digital image containing a car that is generated responsive to the car being placed within the image. The metadata may describe editing operations or user interface state changes that ultimately lead to the state of the document, e.g. tools, functions, selections, menus, and so on.

Once creation of a series of document state snapshots is completed, the computing device compiles the snapshots into a timeline in chronological order, one to another. The timeline, for instance, may be configured as a static image, an animated gif, animation, movie, and so on that is used to output the series of document state snapshots in chronological order. The computing device may integrate the metadata associated with the document states by including visual representations of tools used to create the snapshots before the representative snapshots (inserted), in conjunction with the snapshots (overlay or augmentation), as timeline metadata (subtitles), and so on. The computing device then outputs the timeline such that a user may view this chronological order and thus gain insight into how the document was created in an efficient and intuitive manner.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

When creating a document, such as a digital painting, a number of editing operations may be performed by a computing device responsive to user inputs in order to achieve a final version. Each of the editing operations creates a respective altered state of the document, such as edited text, edited images, and so forth. In some instances, as previously described, a user may wish to chronicle how the document was created, such as to teach other users. Conventional techniques to do so, however, are complicated, inefficient, and even inaccurate in actually portraying how the document was created.

Accordingly, timeline creation techniques and systems are described. In order to create a timeline, at various points throughout the document creation process, the computing device generates document state snapshots of the document. Each document state snapshot is a visual representation of the document at a time at which the snapshot is created, such as a thumbnail image, a lower resolution version of the document, and so on. The document state snapshot may be created by the computing device in a variety of ways. In one example, the document state snapshot is generated responsive to performance of an editing operation on the document that meets at least one defined criterion, such as an amount of modification performed, completion of the editing operation, type of editing operation, an expiration of a timer, and so forth. In another example, document state snapshots are generated by the computing device in response to receipt of a user input to create the document state snapshot. The computing device also records metadata associated with the respective document state snapshots, such as tools used to create the respective document states, operations, menu selections, and so on. Thus, document state snapshots may be generated automatically by the computing device without user interaction, explicitly at the request of a user, or any combination thereof.

Snapshots are continually generated and associated metadata stored during the document creation process as the criteria are met or more user requests to create the snapshots are received. As a result, a series of document state snapshots are created that represent states of the document at various points in time during the creation of the document. The computing device then compiles the generated document state snapshots and associated metadata chronologically into a timeline for output. The timeline may be configured in a variety of ways from data of the document state snapshots, such as a static image, an animated gif, an animation, a movie, and so on. In this way, a user that interacts with the timeline can efficiently and accurately follow a process used to create the document, e.g., without missing relevant steps or exposure to extemporaneous information. A variety of other examples are also contemplated as further described in the following sections.

An example environment is described that may employ the techniques described herein. Example procedures are also described which may be performed in the example environment as well as other environments. Consequently, performance of the example procedures is not limited to the example environment and the example environment is not limited to performance of the example procedures.

Terms

The terms "electronic document" and "document" refer to any electronic file that contains text, graphics, images, video, digital information, or any combination thereof. Examples of documents are word processing documents, digital images, 2D/3D CAD files, videos, forms, presentations, digital photographs, portable document formats (PDF), and so on.

The term "editing operation" refers to any sort of composition or editing operations such as text entry/removal, object creation/removal, object modification, color changes, layer creations, and so on that is usable to transform a document by a computing device.

The terms "document state" and "altered state" refers to a condition of an electronic document at any given time. When an editing operation is performed, a new document state is created for a document.

The term "metadata" in the context of this disclosure refers to information surrounding a document state such as tools used to create the document state from a previous document state, selections of editing operators or functions, menu functions, and so on.

The terms "document state snapshot" and "snapshot" refer to a visual representation of a document state at a time when the document state snapshot was created. Examples of document state snapshots are images, thumbnails, lower resolution images, and so on.

The term "timeline" refers to a single file comprising a series of document state snapshots that are combined chronologically based on the time the snapshots were generated. Examples of timelines are static images, animated gifs, animations, movies, slideshows, and so on.

The term "timeline module" refers to functionality implemented at least partially in hardware to create a timeline of document creation states.

Example Environment

Figure 1:
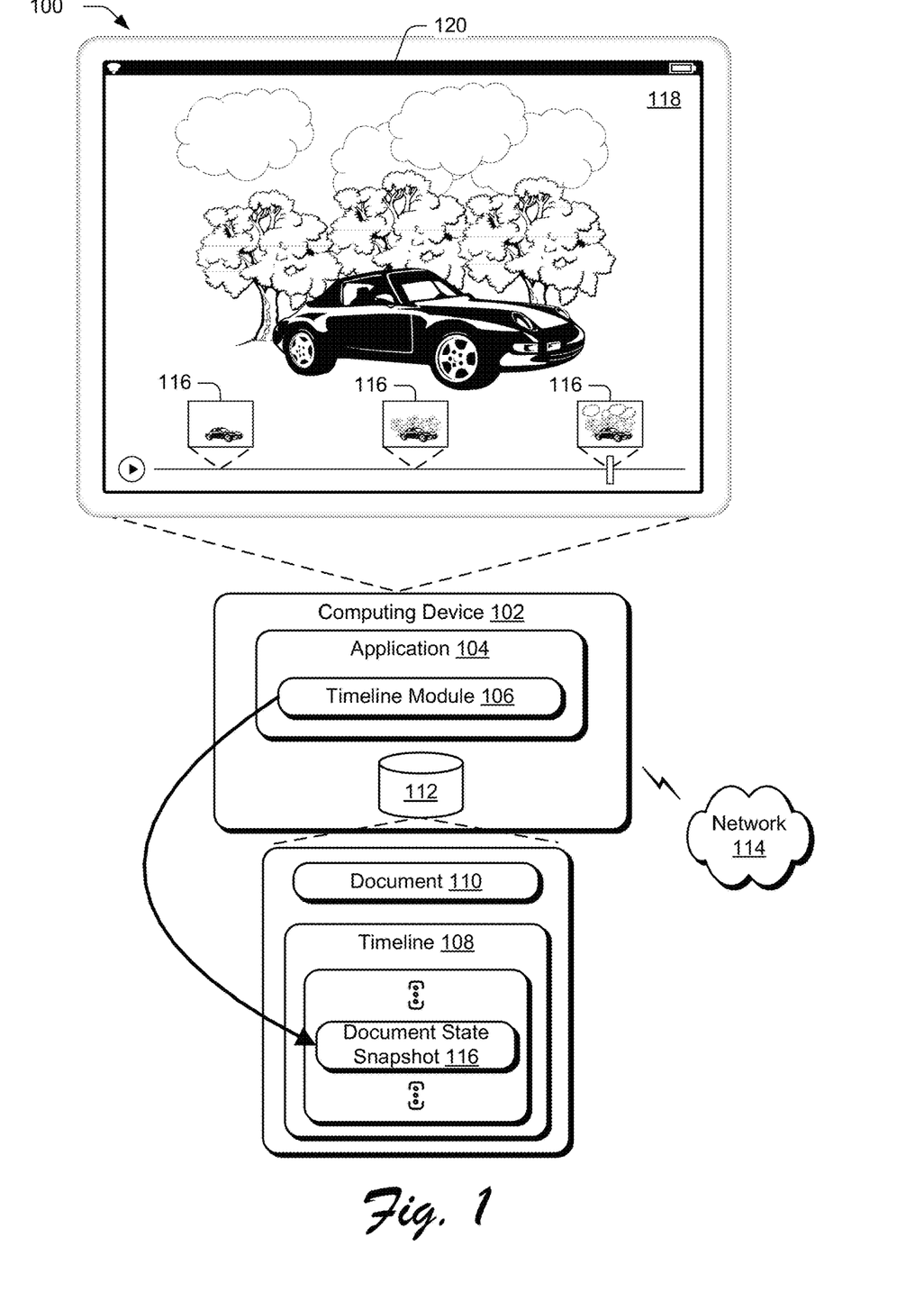
FIG. 1 is an illustration of a digital medium environment in an example implementation that is operable to create a timeline of document states.

FIG. 1 depicts a digital medium environment, generally at 100, in an example implementation that is operable to create timelines of document creation states. The illustrated digital medium environment 100 includes a computing device 102 that contains an application 104. Application 104 contains a timeline module 106 that is implemented at least partially in hardware of the computing device 102 to create a timeline 108 from data describing document states of a document 110, which are both illustrated as stored in storage device 112. In one implementation, application 104, timeline module 106, timeline 108, document 110, or any combination thereof may be implemented in whole or in part "in the cloud" via network 114, e.g., the Internet, a Wi-Fi network (e.g., in accordance with one or more IEEE 802.11 standards), a wireless network, cellular data network, and so forth.

In order to create the timeline 108, the timeline module 106 monitors document 110 for changes or user inputs. When changes to the document 110 or user inputs meet at least one criterion, for instance, the timeline module 106 generates a document state snapshot 116 and stores metadata associated with the document state snapshot 116. Again, the metadata may be any information associated with a state of the document at a time of the document state snapshot 116 such as editing operations that lead to the state of the document, tools used to achieve the state of the document, user inputs to a user interface, and so on. The document state snapshot 116 is a visual representation of the state of the document 110 at a time of creation, such as a thumbnail image, a lower resolution image of the document 110, and so on. The document state snapshot 116 may depict parts of the document 110 that may be outside of a display window of the application 104 that is editing the document 110. The document state snapshot 116 may also exclude user interface elements such as mouse icons, menu bars, and so on. Inclusions and exclusions within the document state snapshots 116 are discussed further with respect to FIG. 4.

Criteria that triggers a document state snapshot generation may be implemented in a variety of ways. Examples of criteria include an amount of modification to the document 110, completion of an editing operation to the document 110, type of editing operation to the document 110, an expiration of a timer, and so forth. For example, the timeline module 106 may determine that an amount of change between a document state corresponding to a previous document state snapshot 116 and a current document state has surpassed a threshold value. In response, the timeline module 106 creates another document state snapshot 116 for the current document state. In one implementation, a document state snapshot 116 is generated in response to receipt of a user input requesting creation of the document state snapshot 116. For example, a user may believe that a particular document state is of particular relevance in describing how the document 110 is created and request that the computing device 102 generate a document state snapshot 116 at that time.

After creation of the document state snapshot 116, the timeline module 106 may then add the document state snapshot 116 to the timeline 108, e.g., at the time of creation or once a series has been collected. The computing device 102 may also include portions of the metadata associated with the document state snapshot 116. For example, the computing device may place visual representations of tools used to create the state of the document in front of the document state snapshot 116 or overlain on top of the document state snapshot 116. The computing device 102 then outputs the timeline 108 with the document state snapshots 116 along with any inserted metadata, which may be organized in a chronological order and combined into a single file for consumption. The timeline may be configured in a variety of ways, such as a static image containing the document state snapshots 116, an animated gif, slideshow, animation, movie, and so on. For example, a user interface view of a timeline 118 that includes an animation may be displayed by a display device 120 of the computing device 102 such that the document state snapshots 116 and associated metadata may be easily navigated between. In this way, the timeline 108 chronicles meaningful document creation states and conveys a process used to create document 110 without extemporaneous information that may confuse a user.

Figure 2:
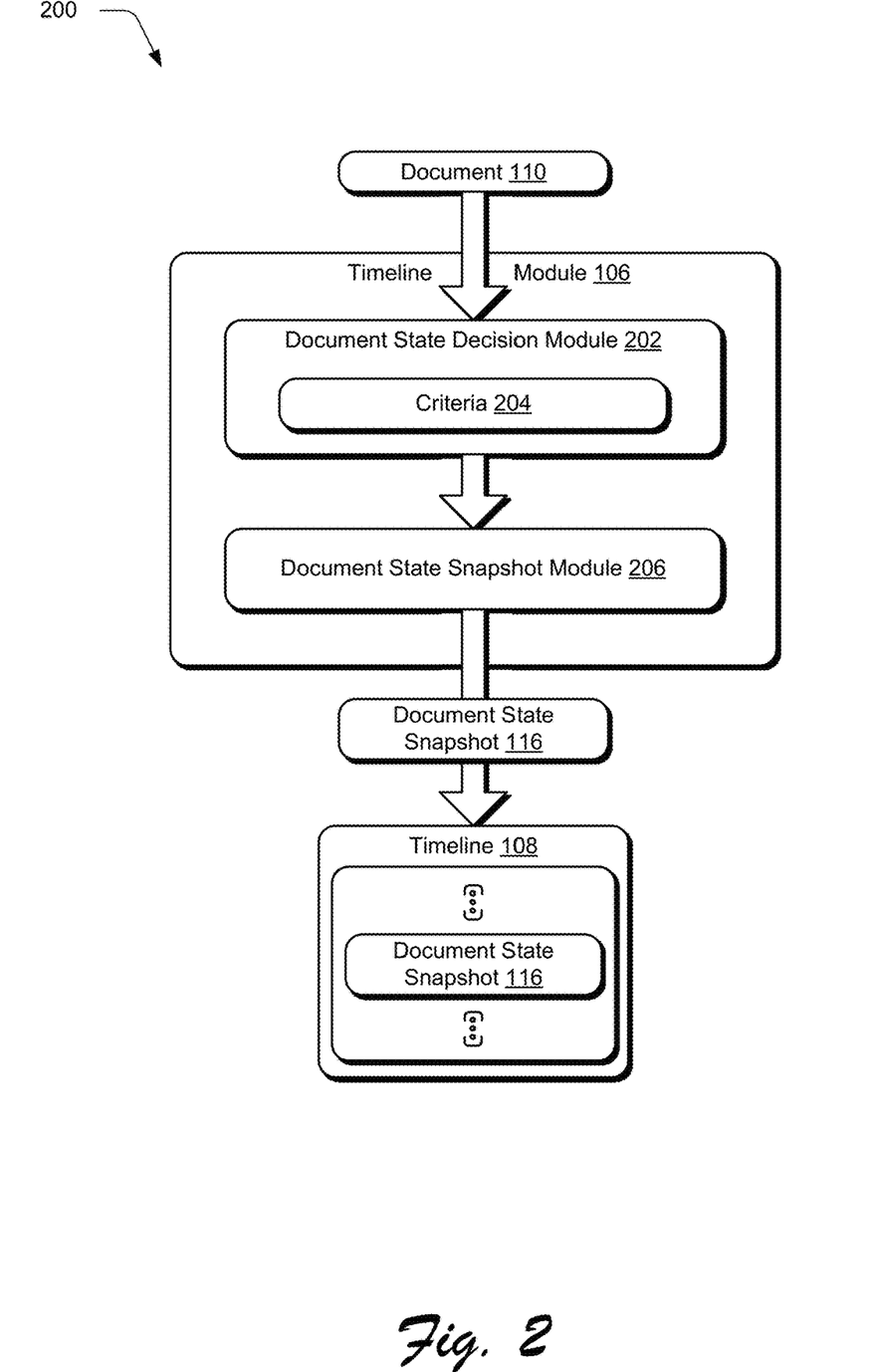
FIG. 2 is an illustration of an example digital medium implementation illustrating a timeline module of FIG. 1 in greater detail.

FIG. 2 depicts an example implementation, generally at 200, showing operation of the timeline module 106 of FIG. 1 in greater detail as creating a document state snapshot 114 and adding document state snapshot 114 to the timeline 108. To begin, the timeline module 104 contains a document state decision module 202 that is implemented at least partially in hardware to monitor changes to document 110 and user inputs to application 104 (not shown). Document state decision module 202 contains at least one criterion 204 that defines when a document state snapshot 116 is to be created for a particular document state.

Criteria 204 that serve as a basis to determine when to form the document state snapshot 116 may be implemented in a variety of ways. Examples of criteria 204 include an amount of change between a previous document state for which a document state snapshot 116 was created and a current document state, a completion of an editing operation to the document 110, a completion of a specific type of editing operation to the document 110, and so on. For example, document state decision module 202 may be configured to request a document state snapshot 116 responsive to determining that enough pixels within the document 110 have changed values. Similarly, an editing operation may comprise a slide bar or any other number of options that define how the editing operation changes the document.

In another example, the document state decision module is configured to request a document state snapshot 116 upon completion of the editing operation, e.g. when the final options are selected and applied. This way, document state snapshots are not created for edits that are not ultimately included in the final document 110. Any number of criteria may be used to determine when document state snapshots are created. For example, a user may be able to select one or more criteria from a list of criteria or may be able to add personalized criteria regarding what types of changes to the document 110 trigger document state snapshot 116 creation.

As discussed above, one of the criteria 204 may involve a user input to generate a document state snapshot 116 at a particular point in time. For example, a user may believe that a current document state is relevant and thus creation of the document state snapshot 116 is desired. In this case, a user input may be received by the computing device requesting creation of the document state snapshot 116. By using a type of machine learning, the document state decision module 202 may also learn what types of changes to the document 110 the user has desired in the timeline 108 such that the computing device can generate similar document state snapshots 116 automatically in the future without user input, e.g., through use of a neural network. Similarly, the document state decision module 202 may use data from other users to identify criteria 204 that is relevant for creating document state snapshots 116.

Whenever any of the criteria 204 are met, a request is sent by the document state decision module 202 for a document state snapshot to a document state snapshot module 206. The document state snapshot module 206 is implemented at least partially in hardware to generate a document state snapshot 116 of a current state of the document 110, e.g., which may include a timestamp usable to define a temporal snapshot order, and store any metadata associated with the current state of the document 110. The document state snapshot module 206, for instance, may create a thumbnail of the document, a lower resolution version of the document, an image capture of the document, and so on. The document state snapshot module 206 then adds the generated document state snapshot 116 to the timeline 108 along with the stored metadata based on the timestamp for the document 110. If the timeline 108 does not already exist at this point, the document state snapshot module 206 may create the timeline 108 and add the document state snapshot 116 as the first snapshot in the timeline. Other examples are also contemplated, such as forming a collection of document state snapshots 116 that once completed are then used to form the timeline 108.

Figure 3:
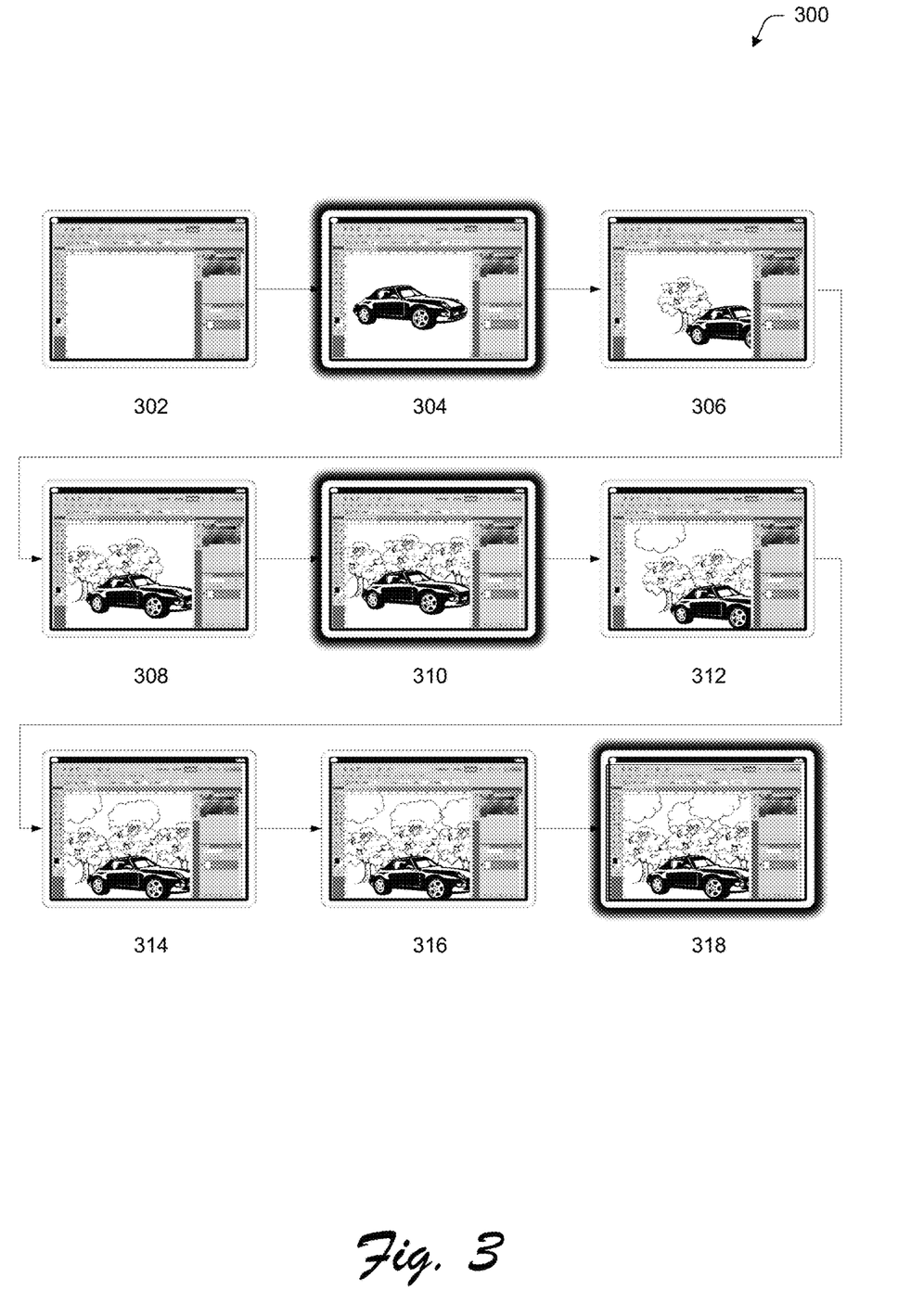
FIG. 3 is an illustration of an example implementation illustrating various altered states of a document including a subset of altered states that meet a criterion.

FIG. 3 depicts an example implementation, generally at 300, showing functions of the timeline module 106 as selecting some of the altered states for document state snapshot creation by document state snapshot module 206. In this example, image creation is shown as an example of document creation. Frames 302-318 illustrate various altered states of the image in the user interface responsive to various editing operations performed on the image. Frame 302 depicts the user interface with a blank image indicative of a start of creating the image. Frame 304 illustrates a creation of a car. A dark border around frame 304 signifies that the frame meets one of the criteria 204 and that a document state snapshot of the altered state is to be created. Frame 306 has an added tree and frame 308 has a second added tree.

At frame 310 a third and final tree has been added to the image. Again, the dark border around frame 310 signifies that one of the criteria 204 has been met to cause creation of a snapshot. In this case, a threshold number of pixels have changed between frame 304 and frame 310 to trigger a document state snapshot creation by the document state snapshot module 206. Alternatively, each of frames 306-310 may be part of a larger editing operation. For example, a slide bar may be used to specify a number of trees to be added to the image. Frames 306 and 308 show one or two trees, respectively, while frame 310 shows three trees. A user input to the user interface applying the third tree to the image thus triggers creation of a document state snapshot in this example. Similar to frames 306-310, frames 312-318 show addition of first, second, third, and fourth clouds, respectively. Like frames 304 and 310, the altered state of the image in frame 318 meets one of the criteria 204, thus, a document state snapshot is created. Again, this may be triggered through comparison to a pixel threshold, completion of an editing operation, a user request to take a document state snapshot, and so on.

Figure 4:
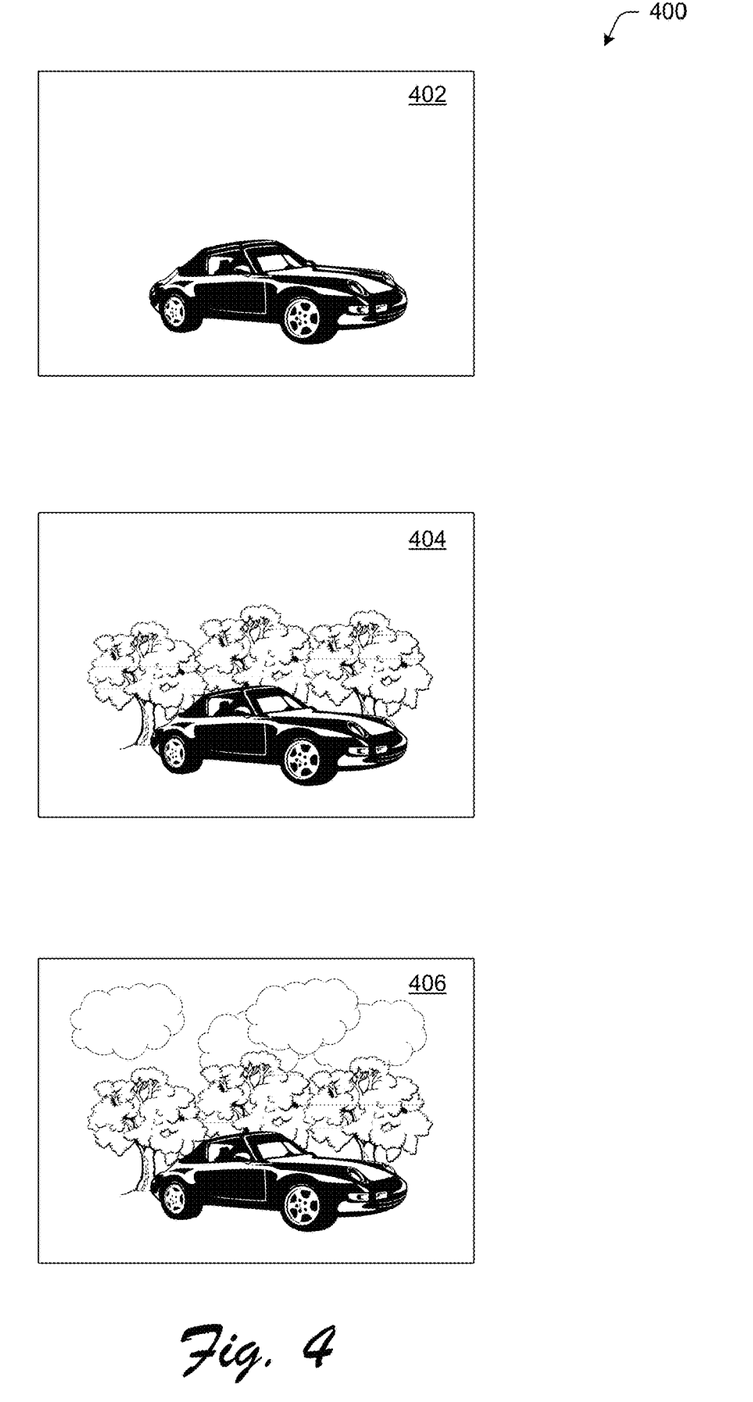
FIG. 4 is an illustration of an example implementation illustrating document state snapshots created from the subset of altered states from FIG. 3.

FIG. 4 depicts an example implementation, generally at 400, showing results of creation of the document state snapshots by the document state snapshot module 206 of FIG. 3. In this example, document state snapshots 402, 404, 406 are created from the selected altered states of the image represented in frames 304, 310, and 318, respectively. As shown, the document state snapshots 402, 404, 406 represent a visual indication of the image at the three points in the image creation designated by frames 304, 310, and 318. As discussed above, the user interface elements (i.e., the "chrome" of the user interface) are not captured in document state snapshots 402-406. However, in other implementations the user interface elements are captured by the computing device. Furthermore, as shown in document state snapshot 406, portions of the image are captured that are not visible in the interface of frame 318. For example, parts of the car, trees, and clouds are not visible in the display window in frame 318 but are depicted in document state snapshot 406. Thus, a user is provided with relevant document state snapshots without requiring navigation to zoom, pan, rotate, or crop a display of the user interface. Although not shown, the metadata associated with document state snapshots 402, 404, 406 may comprise a "car tool," a "tree tool," and a "cloud tool" respectively.

Figure 5:
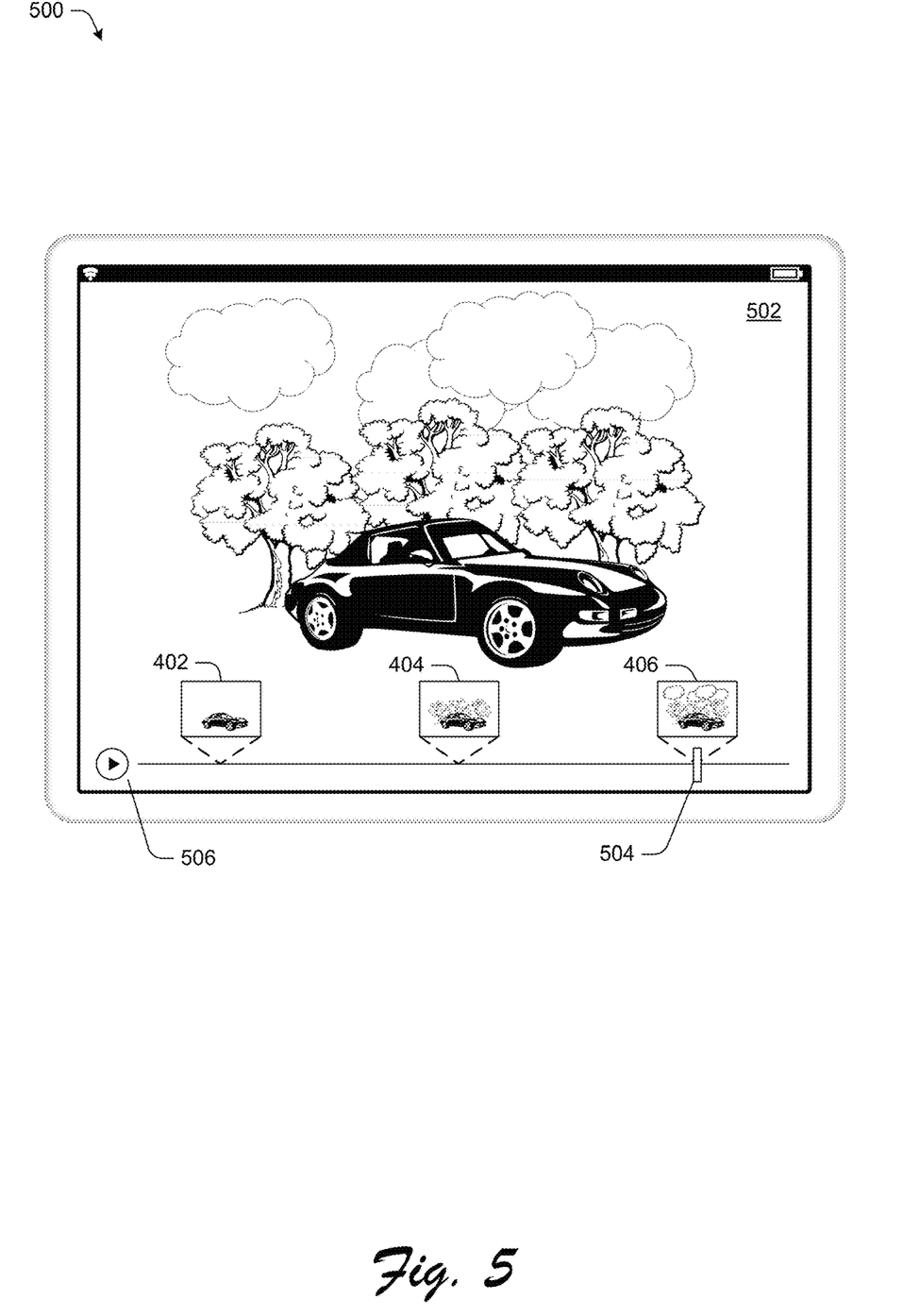
FIG. 5 is an illustration of an example implementation illustrating an animated timeline created from the document state snapshots of FIG. 4.

FIG. 5 depicts an example implementation, generally at 500, showing creation of an example timeline from document state snapshots 402-406 of FIG. 4. Furthermore, the timeline may include the metadata associated with the document state snapshots, such as including visual representations of the car, tree, and cloud tools either before the respective snapshots, overlain on top of the respective snapshots, or as an alteration to the timeline, i.e. subtitles within an animation. In this example, the timeline is shown as an animation wherein a transition between document state snapshots 402-406 is displayed automatically. A user may be able to manipulate a slide bar 504 to view various document state snapshots within the timeline or the user may view the entire animation by hitting a play button 506. The play button 506 causes a display of the document state snapshots 402-406 in a chronological order of when the associated altered states of the document occurred.

Through use of the techniques described herein, a user can create a chronological timeline of document creation states from selected altered states of a document. Selected altered states may be user driven, automatically determined by a computing device, or some combination thereof. In this way, a user that interacts with the timeline can efficiently and intuitively follow a process used to create the document without missing relevant steps or being exposed to extemporaneous information or unhelpful steps.

Example Procedures

The following discussion describes creating timelines of document states that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
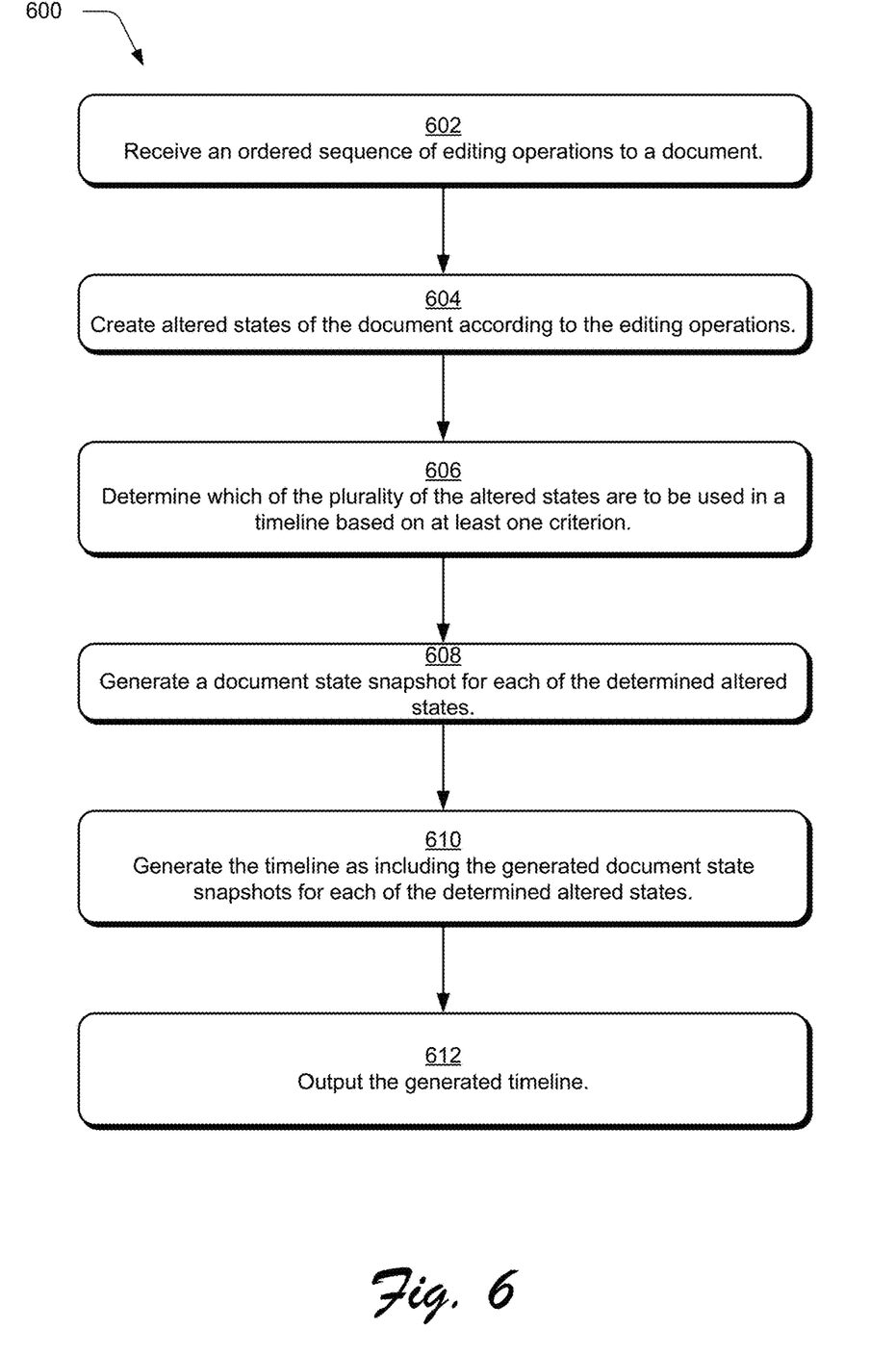
FIG. 6 is a flow diagram depicting a procedure in an example implementation to create an animated timeline of document states.

FIG. 6 depicts, generally at 600, a procedure in an example implementation that creates a timeline of document state snapshots for a document.

First, an ordered sequence of editing operations is received by a computing device from user inputs to modify a document (step 602). The document is any electronic file that contains text, graphics, or any combination thereof. In the example of FIG. 3, in order to create the digital image, the computing device receives user inputs to add the car, trees, and clouds.

Second, altered states of the document are created by the computing device according to the editing operations (step 604). Each of the editing operations creates a respective altered state of the document, such as to change or add text, edit images, add brush strokes, and so forth. Continuing with FIG. 3, altered states of the image are the blank image 302, the addition of the car 304, the addition of the first 306, second 308, and third 310 trees, respectively, and the addition of the first 312, second 314, third 316, and fourth clouds 318, respectively. Thus, every editing operation performed on the document produces a unique altered state of the document, however, not every altered state will be used in the timeline.

Third, which of the altered states are to be used in a timeline are determined by the computing device for inclusion in the timeline based on at least one criterion (506). The criteria may be configured in a variety of ways. The computing device may automatically determine the respective altered states for inclusion in the timeline based on an amount of modification to the document, completion of an editing operation to the document, type of editing operation to the document, an expiration of a timer, and so forth. Although the computing device may determine the altered states without any user input, a user input may be received specifying certain criteria for the computing device to use in the determination. Furthermore, the computing device may determine one or more of the altered states responsive to receipt of a user input requesting creation of a document state snapshot of the particular altered state. The determining may occur in real-time responsive to creating the respective altered states, i.e. as the editing operations are performed, or the altered states may be determined after the document is created, for example, by looking at a log of operations performed on the document. In the example of FIG. 3, the subsequent addition of one and two trees from determined altered state 304 does not cause the computing device to determine another altered state, however, the addition of a third tree causes the determination of the associated altered state 310 for inclusion in the timeline.

Fourth, document state snapshots are created by the computing device for each of the determined altered states (step 608). In addition, the computing device may store metadata associated with each of the determined altered states as discussed above. The document state snapshots are visual representations of the determined altered states at the respective times of the altered states. For example, if three altered states are determined during the creation of the image, then three document state snapshots will be created. The document state snapshots may be configured in a variety of ways, for example as images, thumbnails, lower resolution images, and so on. In addition, the document state snapshots may include elements that are outside of a display window of an interface and may also exclude user interface elements, such that the document state snapshots represent the entire document and only the document. Examples of document state snapshots of determined altered states are snapshots 402-406 of FIG. 4 corresponding to altered states 304, 310, and 318 of FIG. 3.

Fifth, the timeline is generated by the computing device by combining the document state snapshots from step 608 in a chronological order (step 610). The timeline may be configured in a variety of ways, such as a static image, an animated gif, animation, movie, slideshow, and so on. The chronological order is based on an order of when the determined altered states associated with the snapshots occurred during creation of the document. Going back to the image of FIG. 3, if document state snapshots are created for altered states 304, 310, and 318, then the respective snapshots are included in the timeline according to an order of the editing operations that created the respective altered states. The computing device may also determine the chronological order based on timestamps on the snapshots, times associated with the respective altered states, times of operations stored in metadata, times of respective editing operations, and so on. As discussed above, the computing device may include the metadata associated with the document state snapshots from step 608 into the timeline, such as including visual representations of tools used to create the associated altered states.

Sixth, the timeline containing the document state snapshots of the determined altered states of the document is output by the computing device (step 612). For example, in FIG. 5, the animation depicts three key points in the creation of the image (document state snapshots 402-406 of FIG. 4 corresponding to altered states 304, 310, and 318 of FIG. 3). In this way, a user that interacts with the timeline can easily see a methodology of the creator of the document and an ordered sequence of relevant states of the document that lead to a final state of the document.

Example System and Device

Figure 7:
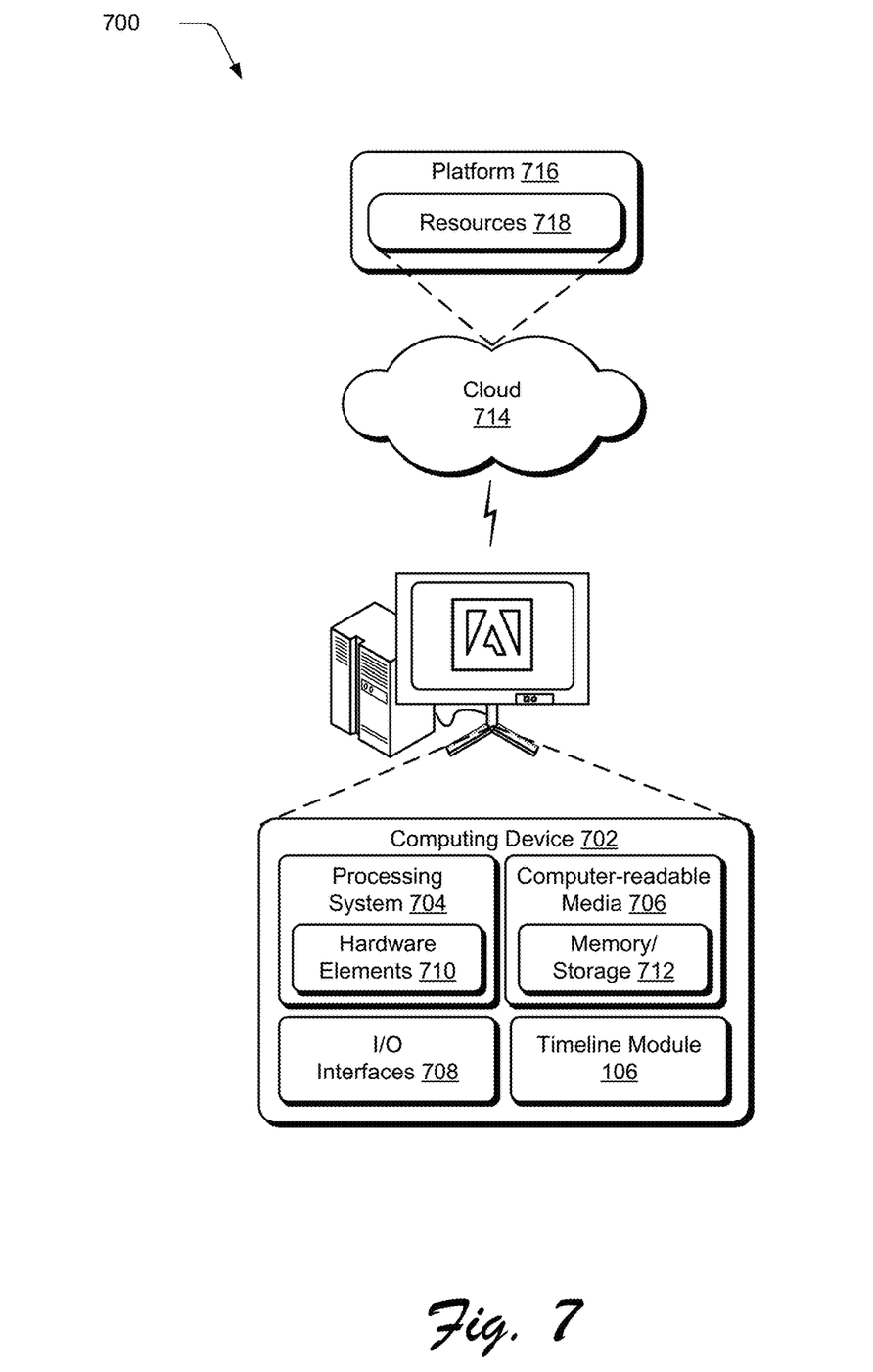
FIG. 7 is an illustration of a system and device in an example implementation that is operable to create timelines of document states.

FIG. 7 depicts, generally at 700, an example implementation showing an example computing device 702 that is representative of one or more computing systems and/or devices that may implement the various techniques described herein. This is illustrated through inclusion of the timeline module 106, which may be configured to create a timeline of document states for a document. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which the elements are formed or the processing mechanisms employed therein. For example, processors may be configured as of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, an ordered sequence of editing operations of a digital image;
generating, by the processing device, altered states of the digital image based on the ordered sequence of editing operations of the digital image;
determining, by the processing device, a subset of the altered states to be used in a timeline based on pixel value changes between the altered states and types of editing operations included in the ordered sequence of editing operations of the digital image using a neural network, the subset of the altered states associated with metadata describing user interface state changes and object modifications based on the ordered sequence of editing operations of the digital image;
generating, by the processing device, a document state snapshot for each altered state included in the subset of the altered states, each document state snapshot including a visual representation of a state of the digital image and excluding user interface elements; and
outputting, by the processing device, the timeline including each document state snapshot and visual representations of the metadata.

2. The method of claim 1, wherein each document state snapshot is generated in real-time.

3. The method of claim 1, wherein the timeline includes an animation, a movie, and a slideshow.

4. The method of claim 1, wherein at least one altered state included in the subset of the altered states is determined responsive to a user input.

5. The method of claim 1, wherein at least one altered state included in the subset of the altered states is determined automatically without user intervention.

6. The method of claim 1, wherein the subset of the altered states is determined based on receiving a user input specifying at least one criterion.

7. The method of claim 1, wherein the subset of the altered states is determined based on an amount of change in the digital image between a previous altered state and a current altered state.

8. The method of claim 1, wherein the subset of the altered states is determined based on a completion of an editing operation.

9. The method of claim 1, further comprising removing a document state snapshot from the timeline.

10. A non-transitory computer-readable storage medium storing executable instructions, which when executed by a processing device, cause the processing device to perform operations comprising:
receiving an ordered sequence of editing operations of a digital image;
generating altered states of the digital image based on the ordered sequence of editing operations of the digital image;
determining a subset of the altered states to be used in a timeline based on pixel value changes between the altered states and types of editing operations included in the ordered sequence of editing operations of the digital image using a neural network, the subset of the altered states associated with metadata describing user interface state changes and object modifications based on the ordered sequence of editing operations of the digital image;
generating a document state snapshot for each altered state included in the subset of the altered states, each document stat snapshot including a visual representation of a state of the digital image and excluding user interface elements; and
outputting the timeline including each document state snapshot and visual representations of the metadata.

11. The non-transitory computer-readable storage medium of claim 10, wherein the operations further comprise removing a document state snapshot from the timeline.

12. The non-transitory computer-readable storage medium of claim 10, wherein the subset of the altered states is determined based on receiving a user input.

13. The non-transitory computer-readable storage medium of claim 10, wherein the subset of the altered states is determined based on an amount of change in the digital image between a previous altered state and a current altered state.

14. The non-transitory computer-readable storage medium of claim 10, wherein the subset of the altered states is determined automatically and without user intervention.

15. A system comprising:
a memory component; and
a processing device coupled to the memory component, the processing device to perform operations comprising:
receiving an ordered sequence of editing operations of a digital image;
generating altered states of the digital image based on the ordered sequence of editing operations of the digital image;
determining a subset of the altered states to be used in a timeline based on pixel value changes between the altered states and types of editing operations included in the ordered sequence of editing operations of the digital image using a neural network, the subset of the altered states associated with metadata describing user interface state changes and object modifications based on the ordered sequence of editing operations of the digital image;
generating a document state snapshot for each altered state included in the subset of the altered states, each document state snapshot including a visual representation of a state of the digital image and excluding user interface elements; and
outputting the timeline including each document state snapshot and visual representations of the metadata.

16. The system of claim 15, wherein the subset of the altered states is determined based on a completion of an editing operation.

17. The system of claim 15, wherein the operations further comprise removing a document state snapshot from the timeline.

18. The system of claim 15, wherein the subset of the altered states is determined based on receiving a user input.

19. The system of claim 15, wherein the subset of the altered states is determined based on an amount of change in the digital image between a previous altered state and a current altered state.

20. The system of claim 15, wherein the timeline includes an animation, a movie, and a slideshow.

* * * * *